INVENTOR
Frank T. Caporael

March 14, 1967 F. T. CAPORAEL 3,308,716
APPARATUS FOR DARK FIELD BACKGROUND PHOTOGRAPHY OF
MEDICAL AND BIOLOGICAL SPECIMENS
Filed Oct. 6, 1964 3 Sheets-Sheet 2

INVENTOR
Frank T. Caporael

BY
Wilkinson, Mawhinney & Theibault
ATTORNEYS

INVENTOR.
Frank T. Caporael
BY
Wilkinson, Mawhinney & Theibautt
ATTORNEYS

United States Patent Office 3,308,716
Patented Mar. 14, 1967

3,308,716
APPARATUS FOR DARK FIELD BACKGROUND PHOTOGRAPHY OF MEDICAL AND BIOLOGICAL SPECIMENS
Frank T. Caporael, Gaithersburg, Md., assignor, by mesne assignments, to Photolume Corporation, Bethesda, Md., a corporation of Maryland
Filed Oct. 6, 1964, Ser. No. 401,925
4 Claims. (Cl. 88—24)

The present invention relates to apparatus for dark field background photography of medical and biological specimens, and has for an object the provision of a light box for use beneath a camera for providing a dark field in which none of the light rays produced from the light box contact the specimens directly.

Another object of the present invention is the provision of apparatus for dark field photography in which the light employed may be increased or decreased, but which is of constant intensity. In the past such proposed boxes have contained fluorescent lights subject to the variations attendant with sixty cycle current, but I have found in practice that incandescent lamps will produce a more uniform light source the intensity of which is constant and the light level of which may be varied dependent upon the object being photographed.

A further object of the present invention is the provision of a sub-assembly unit which may be employed with presently existing light boxes which have been modified from fluorescent type lamps to incandescent lamps, which sub-assembly is provided wiht a frame supporting variable masking means for regultaing the light area opening upon which the object to be photographed is placed and which structure includes a deflecting baffle plate having a flat base and upwardly directed divergent side walls which deflect the light rays emitted from the incandescent lamps at an angle outwardly against the specular wall of the light box which causes the light rays to then be deflected toward the specimen supporting surface and to strike same at an angle of the order of 27°. This angle may be increased or decreased with greater degrees of definition of dark field. However, I have found a 27° angle to be most satisfactory.

A still further object of the present invention is the provision of the light baffle in the sub-assembly with a light absorbent coating being non-reflective to light rays, striking same to give a further more sharply defined dark field employing the principles of diffused radiation.

By dark field I mean herein an illuminated area, which area does not directly reflect light rays causing distortion or lack of definition with respect to light rays coming to and from the object being photographed but rather diffuses the light rays to define a sharp photographic field.

I have found in the field of medical biology that the photographing of cultures and specimens are more sharply defined and more accurately depicted when photographed over a light box having incandescent lamps, specular wall light reflecting surfaces and a diffusion radiation baffle plate positioned between the incandescent lamps and the photographic opening defined by a variable masking means and in which the diffusion deflecting surface is coated with a light absorbent material such as velour or flocking.

With the foregoing and other objects in view, the invention will be more fully described hereinafter, and will be more particularly pointed out in the claims appended hereto.

In the drawings, wherein like symbols refer to like or corresponding parts throughout the several views.

Figure 1:
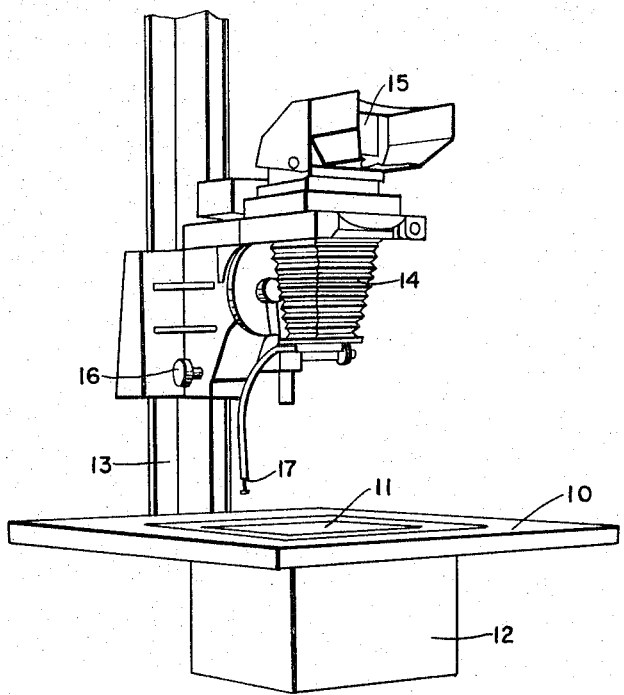
FIGURE 1 is a perspective view of a photographic unit assembly for doing dark field photography in accordance with the present invention.

Referring now to the drawings and for the moment to FIGURE 1, 10 designates a baseboard having a rectangular opening 11 therethrough into which is received and supported a light box 12. Mounted on the top surface of the baseboard 10 and upstanding therefrom is a camera column 13 carrying a photographic camera 14 adjustably positionable therealong. The camera is moved vertically along the column 13 and the photographer views through the reflex lens 15 adjusting the proper focal length and simultaneously controlling field illumination. When the proper focal length is obtained the set knob 16 is secured and the cable release 17 is actuated by the operator when the other photographic conditions are met.

Figure 3:
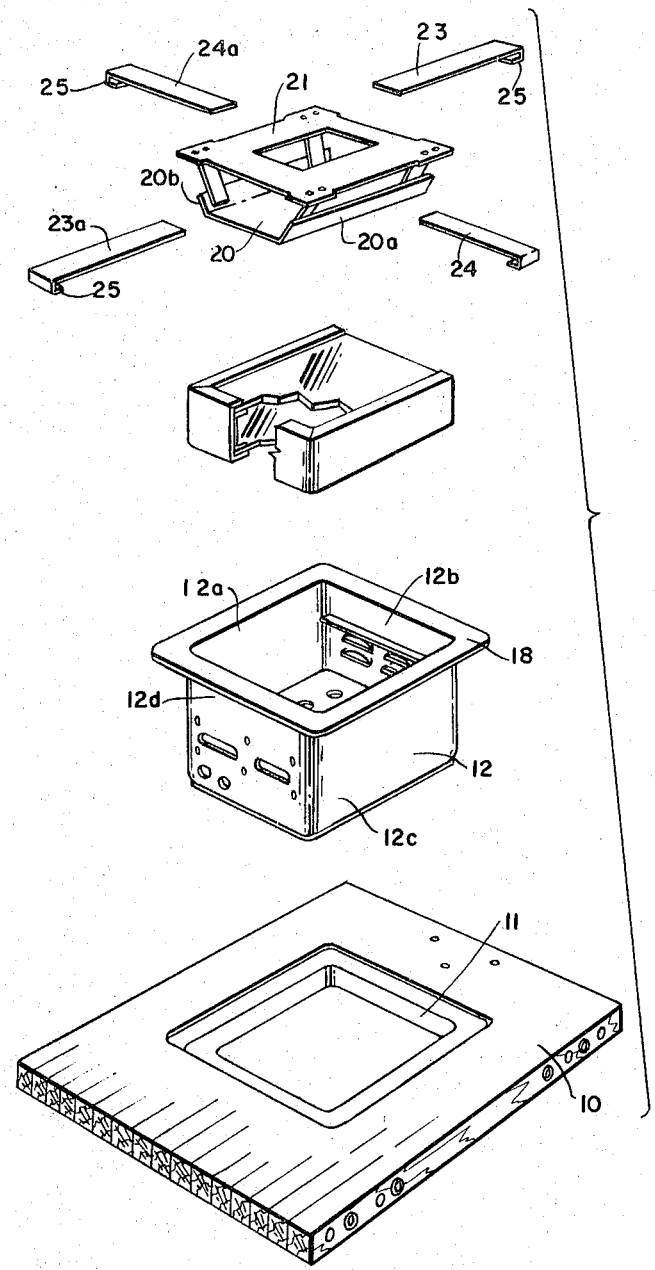
FIGURE 3 is an exploded perspective view of the light field baseboard, light box and dark field baffle assembly.
Figure 4:
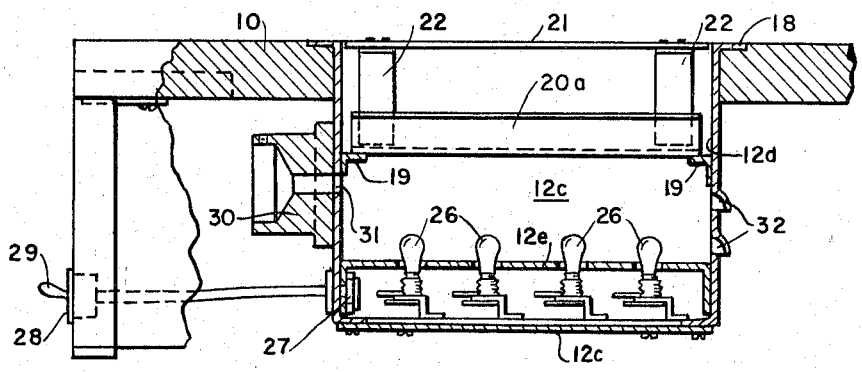
FIGURE 4 is a sectional view taken through the light box and baseboard constructed in accordance with the present invention having parts broken away and parts shown in section.
Figure 5:
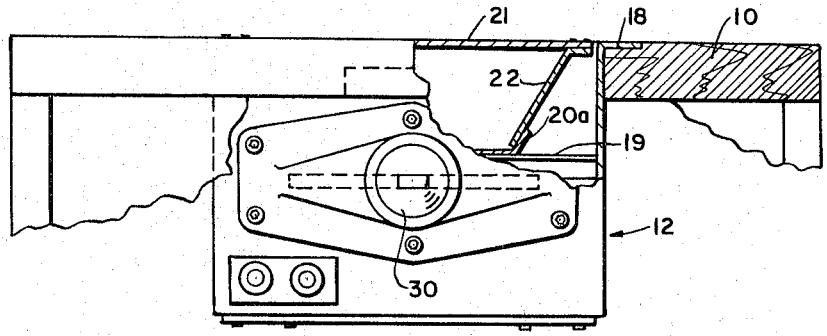
FIGURE 5 is a view similar to FIGURE 4 but taken at right angles thereto.

Referring now to FIGURE 3, the light reflective box 12 is shown having highly specular light reflective interior surfaces $12^a$, $12^b$, $12^c$ and $12^d$. About the top of the light box 12 is a rim assembly 18 which rests upon the opening 11 in the baseboard 10. Located within the light reflective box, as best seen in FIGURES 4 and 5, are angular support members 19 secured thereto upon which rests a light deflecting plate 20 having upwardly divergent side walls $20^a$ and $20^b$, as further best seen in FIGURE 3.

Figure 2:
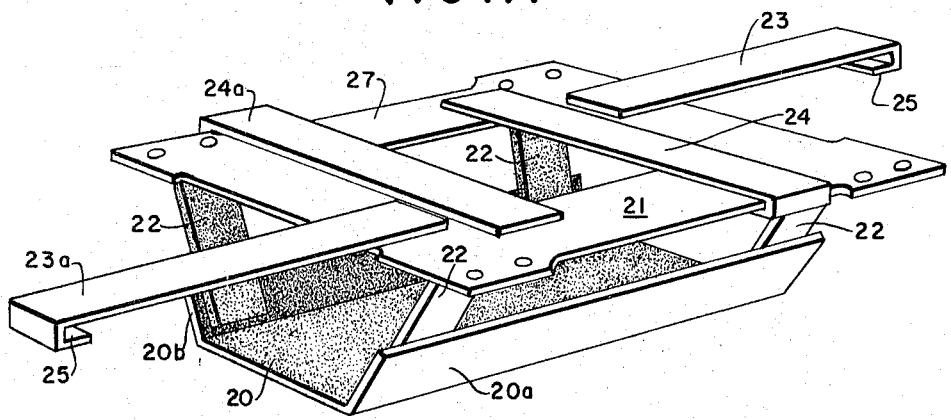
FIGURE 2 is a perspective view of the dark field baffle sub-assembly employed with the present invention.

Looking at FIGURE 2, it will be noted that the light diffusing plate 20 is secured to a substantially rectangular frame construction 21 by spacers 22. The frame 21 is flat and defines a sliding plane surface for four masking plates 23, $23^a$ and 24, $24^a$, having downwardly turned lips 25 which lock over and slide along the frame 21.

As shown in FIGURE 2, when the transverse width of the area to be photographed is to be increased the plates 24, $24^a$ are moved further apart as when the field is to be decreased plates 24, $24^a$ are moved closer together. The same applies when the vertical height of the picture is to be increased the plates 23, $23^a$ are moved toward or away from each other and by various increments of relative motion between these plates a large or small opening to the dark field may be defined.

The interior surface of the diffusion plate 20 and its upstanding divergent walls $20^a$ and $20^b$ is coated with velour or a flocking material which is highly absorbent to light rays and will not reflect light rays directly.

The light source employed in the light box 12 is best seen in FIGURE 4 in which the light box 12 contains a base $12^e$ which supports incandescent lamps 26 which are wired in a well-known manner in a conventional electric circuit having a variable resistor therein to regulate the potential applied to the filaments of the lamps whereby the light intensity level within the light box may be increased or decreased.

A variable resistor 27 is shown in circuit with the lamps 26 having an operating handle 28 and operating switch 29 cutting the lamps on or off. A blower 30 is provided for supplying cooling air to the light box through a duct 31 and exhaust apertures 32 to avoid overheating of the light box and any injury which might result due to overheating the specimens being photographed.

When it is desired to photograph and make documentation detailed studies of the growth rate; by way of example only of microorganisms, they are placed in the well-known culture dish and the photographic background opening necessary to supply the proper light from the underside of the culture dish is regulated by the proper placement of the slide plates 23, 23ª and the plates 24, 24ª. The photographer then cuts on the switch 29 illuminating the incandescent lamps 26 and in viewing the specimen through the reflex lens 15, he focuses the camera and tightens the focusing knob 16 at the proper setting and turns the variable resistor 28 to bring the light level up to the desired point for emphasizing the features to be photographed in the specimens in the culture dish.

It will be appreciated that while I have referred to the photography of microorganisms herein the light box of the present invention may be equally applicable to the photography of medical specimens of such things as tissue, bone, organs, etc., which are to be placed upon a glass or transparent surface which must be illuminated from the underside without glare or intense light reflection which of course would result in photographic distortion.

The light rays emitted from the lamps 26 are reflected from the walls 12ª and 12ᶜ by the deflection portions 20ª and 20ᵇ of the diffusion baffle plate 20 and the light rays are caused to then be reflected from the specular highly light reflecting walls of the light box to strike the glass, plate, dish or other object supporting the photographic object whereby the light rays strike at an angle measured downwardly from the horizontal of the frame 21 at an angle of the order of 27°.

The light reflecting surface within the light box 12 is not limited to the highly specular light reflecting surfaces of the interior of the light box itself but is further assisted by the specular reflective surface of plate 12ᵉ immediately behind the lamps 26.

Although I have disclosed herein the best form of the invention known to me at this time, I reserve the right to all such modifications and changes as may come within the scope of the following claims.

What is claimed is:

1. For use with a camera for photographing, cataloging and documentation of objects which must not be subject to direct light rays, a dark field baffle box comprising a box-like receptacle having a specular highly light reflecting interior surface, variable intensity incandescent lamps therein, a baffle assembly having a support frame receivable over the open end of said box-like receptacle, variable masking means carried by said support frame for regulating the photographic field opening, and light diffusion radiation deflection means carried by and suspended beneath said support frames, said light diffusion radiation deflection means having a flat base and upwardly divergent sides coated with light absorbing material of the group of velour and flocking porous to light so that the light emitted from the incandescent lamps will be reflected from the specular light reflecting surfaces of the box-like receptacle to indirectly illuminate the area between the light diffusion deflection means flat base and variable masking means whereby the obejct to be photographed has uniform indirect background illumination.

2. A dark field baffle box as claimed in claim 1 wherein said box-like receptacle specular walls have support means for supporting said baffle assembly a predetermined distance above said lamps.

3. For use with a photographic background box having variable intensity incandescent lamps in the base thereof and specular highly light reflecting walls, a dark field baffle assembly comprising an object supporting frame, variable masking means carried by said frame to regulate the area of illumination of the background opening for the object to be photographed, and a light diffusion deflecting plate carried by said object supporting frame, said plate having a base and upwardly divergent sides and being coated with a light absorbent material.

4. A dark field baffle assembly as claimed in claim 3 wherein said variable masking means are slidable overlying plates each being movable relative to the others and each pair being movable 90° relative to the other pair whereby the length and width of the photograph field.

References Cited by the Examiner
UNITED STATES PATENTS

| | | | |
|---|---|---|---|
| 2,256,396 | 9/1941 | Luboshez | 88—24 |
| 2,277,147 | 3/1942 | Rogers | 88—24 |

NORTON ANSHER, *Primary Examiner.*

R. A. WINTERCORN, *Assistant Examiner.*